Nov. 4, 1952  M. L. LOVE  2,616,234
COUNTERWEIGHTED DRIVE MECHANISM FOR HARVESTERS
Filed May 18, 1950
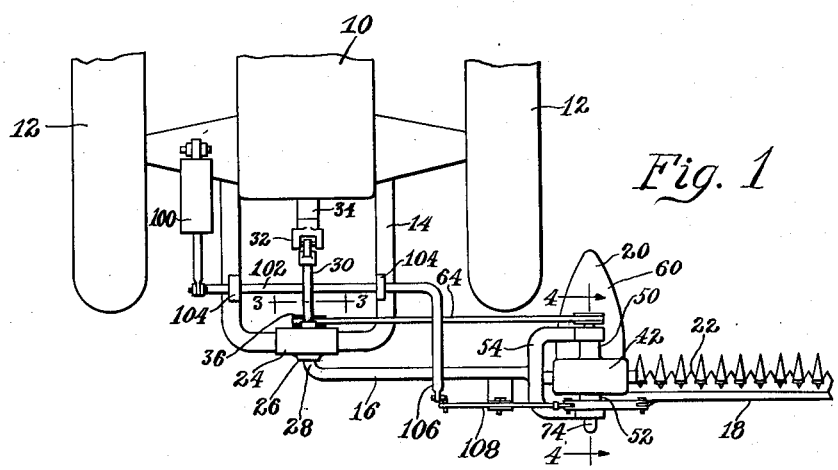
INVENTOR.
Mahlon L. Love
BY
*Attorneys*

UNITED STATES PATENT OFFICE 2,616,234

COUNTERWEIGHTED DRIVE MECHANISM FOR HARVESTERS

Mahlon L. Love, Orion, Ill., assignor to Deere & Company, Moline, Ill., a corporation of Illinois Application May 18, 1950, Serial No. 162,654

16 Claims. (Cl. 56—25)

This invention relates to sickle drive mechanism for harvesters and more particularly to improved drive mechanism in which the inertia forces created by reciprocation of the sickle are balanced against inertia forces created in opposition to those of the sickle by means of a reciprocating counterweight.

Harvesters having cutter bars may be of several types, such as grain harvesters and mowers. In either type of harvester, vibration in the machine created by reciprocation of the sickle presents a serious problem. Since a grain harvester, such as typified by combines and headers, is a relatively large machine, the vibration problem, though present, is not as acute as it is in lighter-weight harvesters such as mowers. The typical mower is directly mounted on or connected to a tractor and the measurement of vibrations created by unbalanced forces indicates the necessity for eliminating or at least reducing this vibration in the interests of increasing the life of the structural components of the machine. In some cases, various parts of the machine have been mounted in rubber or other resilient material in an attempt to isolate the effects of the unbalanced forces. In other instances, attempts have been made to counterweight or counterbalance these forces by the provision of appropriate balancing means. However, although the application of counterbalancing principles to apparatus or machines in which unbalance inertia forces exist would offhand appear to be a simple proposition, many factors must be taken into consideration, such as cost, adaptability of the modified construction for use in conventional environment as close as possible, simplicity, result, efficiency, etc. The problem is quite different from those arising in the balancing of crankshafts in internal combustion engines, for example, because of the relatively short stroke and high speed reciprocation of the sickle and the comparative lack of resistance or cushioning effect of the crop material being cut. In this respect, it may be mentioned that prior attempts to alleviate this problem have sought to utilize rubber cushions or bumpers at opposite ends of the sickle to take up or absorb the inertia forces at the opposite ends of the reciprocation strokes. This approach to the problem has proved unsuccessful because shocks transmitted to such bumpers are merely cumulative and cannot be isolated from the cutter bar or supporting parts connected thereto.

It is a principal object of the invention to balance the inertia forces of a reciprocating sickle in a harvester by means of a counterweight mounted for reciprocation in alternate strokes in opposition to the reciprocating strokes of the sickle. It is a further important object of the invention to utilize existing sickle drive principles insofar as is possible so that the improved drive mechanism may be readily incorporated into harvesters of conventional design. For this purpose, it is a subsidiary object to utilize a rotary input member, an oscillating output member, and a reciprocating intermediate member drivingly interconnecting the input and output members. The input member is driven by conventional means on the harvester supporting structure, and the output member is connected to reciprocate the sickle. It is a feature of the invention to incorporate the counterweight means in the intermediate reciprocating means. Specifically, the reversal of strokes of reciprocation between the counterweight and the sickle is accomplished by means of a lever of the first class connected at one end to the intermediate member and at its other end to the sickle, being fulcrumed on carrier means that carries the intermediate member for reciprocation. The intermediate member is counterweighted substantially in the vicinity of the sickle-connected end of the output member.

In order to further facilitate the adaptation of the improved unit to conventional design, the input member and the oscillating output member are coaxial and the means providing bearings for these coaxial members also provide external coaxial trunnions enabling the mounting of the unit on the inner shoe, for example, of a mower, so that the cutting mechanism may be tilted or adjusted about said axis.

The foregoing and other important objects and desirable features inherent in and encompassed by the invention will become apparent as a preferred embodiment of the invention is fully disclosed in the following detailed description and accompanying sheet of drawings.

In the drawings:

Figure 1 is a plan view of a representative tractor-mower construction embodying the improved drive unit;

Figure 2 is a rear elevational view of the structure shown in Figure 1;

Figure 3 is a fragmentary front elevational view as seen along the line 3—3 of Figure 1;

Figure 4 is an enlarged transverse section taken substantially on the line 4—4 of Figure 1;

Figure 5 is a rear view, partly in section, as viewed along the line 5—5 of Figure 4; and Figure 6 is a sectional view taken substantially along the line 6—6 of Figure 4.

As stated above, the principles of the invention are applicable to harvesters in general. However, since the preferred embodiment disclosed herein was designed primarily for use in a mower, and for the purposes of clarity and brevity in the description, reference will be had to harvester structure as typified by a mower.

The structure chosen for the purposes of illustration and description comprises a mower of the tractor-mounted type, wherein a tractor having a longitudinal body 10 carried between rear traction wheels 12 has a rearwardly extending U-shaped drawbar 14 which provides supporting structure for the mounting of a mower comprising a support in the form of a drag bar 16 on which is mounted cutting mechanism including a cutter bar 18, an inner shoe 20, and a reciprocating sickle 22.

The intermediate portion of the rear of the drawbar 14 carries a casing 24 having at its lower portion a bearing 26 which provides means for supporting the forwardly bent end 28 of the drag bar 16 for swinging about a longitudinal axis. The upper portion of the casing 24 journals a forwardly extending input shaft 30, connected by a universal joint 32 to a drive shaft 34. This drive shaft here represents the conventional power take-off shaft of the tractor.

The casing 24 is provided with a driving sheave 36 (Figures 1 and 3) keyed to a short output shaft 38 which is driven from the shaft 30 by means within the casing, such as a belt 40 as suggested in Figure 2.

The structure described so far represents generally conventional design and may be varied to suit individual desires, since it forms no part of the present invention.

The improved drive mechanism is supported by or contained within a carrier or housing 42 having base means 44 providing for mounting thereof on or affixation thereof to the upper rear portion of the inner shoe 20. Any suitable mounting means may be provided. In the instance illustrated, the carrier or housing 42 is preferably rigidly fixed to the inner shoe 20 generally in alinement with the line of reciprocation of the sickle 22. This housing is provided with a pair of coaxially spaced bearings 46 and 48, the axis of which is transverse to the line of reciprocation of the sickle 22. Each of the housing portions providing the bearings 46 and 48 is provided further with external means effecting trunnions 50 and 52 by means of which the housing or carrier is pivotally connected on a fore and aft axis to a yoke 54 forming part of the supporting structure that includes the drag bar 16.

The bearing 46 provides means for journaling or otherwise movably supporting an input member in the form of a rotary shaft 58 having at its outer end a sheave 60 and at its inner end within the housing 42 a crank arm included in a flywheel 62. As best seen in Figures 1 and 2, the sheave 60 is in alinement with the sheave 36 at the front of the casing 24. These two sheaves may be interconnected by drive means such as a V-belt 64. Since the axis of the input shaft 58 is coincident with the axis of the trunnions 50 and 52, the belt 64 will not be affected by changes in angle between the cutter bar 18 and drag bar 16. Likewise, the belt will be unaffected by changes in angle between the drag bar 16 and the casing 24, since the bearing 26 and sheave 36 are coaxial.

The inner or shoe-proximate end of the sickle 22 has a conventional knife head, here represented as having an upstanding connecting member 66. The member 66 may serve as part of the drive connections established between the input member 58 and other components to be presently described.

The rear bearing 48 carries an output member designated generally by the numeral 68. This member comprises a short shaft section 70 coaxial with the input shaft 58 and having at its inner end within the housing 42 an upstanding crank or lever arm 72 and at its outer end outside the housing 42 a depending crank arm or lever 74. As best shown in Figures 4 and 5, the intermediate lower portion of the housing or carrier 42 is recessed sufficiently to accommodate the stroke of the lower end of the arm 74, whereby the arm may curve forwardly so that its lower end at 76 is substantially in the transverse vertical plane of the housing 42; or, stated otherwise, is substantially directly in alinement with the sickle 22. Any suitable link, such as that shown at 78, may be utilized as means for effecting a driving connection between the lower end 76 of the lever 74 and the knife head member 66 of the sickle 22.

The housing or carrier 42 is provided within its interior with mounting means including upper and lower slide rods 80 and 82 which run parallel to the line of reciprocation of the sickle 22. These rods are fixed at their opposite ends to end walls of the housing or casing 42 and serve as means for carrying a reciprocating or intermediate member designated generally by the numeral 84. This member includes upper and lower mounting portions 86 and 88 respectively slidably carried by the rods 80 and 82. As best seen in Figure 4, the intermediate member 84 is positioned between the flywheel 62 and the crank arm 72. The intermediate member is driven by the input shaft 38 through the medium of the flywheel 62 and driving means including a pin and slot connection, the slot being a vertical slot 90 in the intermediate portion of the member 84 and the pin at 92 on the flywheel 62 having a roller 94 for obvious purposes. The components including the input shaft 58, flywheel 62, and slotted intermediate member 84 make up what is conventionally known as a Scotch crosshead, customarily employed for translating rotary motion to reciprocation motion.

At this point, it might be said that the sickle 22 could be connected directly to the intermediate member 84. Although this would be perfectly proper from the standpoint of merely imparting reciprocating movement to the sickle 22, it is important to note that such connection would merely add the mass of the member 84 to that of the sickle, which would go a long way toward aggravating the problem that the present invention is seeking to eliminate. Therefore, such direct connection is discarded in favor of the indirect connection made by means of the output member 68 and driving means between this member and the intermediate member 84. This driving means is effected by a pin and slot connection including a short vertical slot 96 in the upper end of the crank arm 72 and a pin and roller 98 carried at the upper mounting portion 86 of the intermediate member 84.

As will be apparent from an examination of Figures 4, 5 and 6, rotation of the flywheel 62 will reciprocate the member 84 in opposite alternate strokes within the confines of the housing or carrier 42. Since it is undesirable to phase this reciprocation with that of the sickle, the output member 68, comprising a lever of the first class as explained before, is utilized to reverse the phasing of reciprocation; in other words, the reciprocation of the member 84 is in alternate strokes opposite to the alternate strokes of reciprocation of the sickle 22. Therefore, the mass of the member 84 is not added to that of the sickle 22, but rather is opposed thereto. The lower portion 88 may be connected to or otherwise associated with counterweight means so proportioned as to balance the inertia forces created by the reciprocation of the member 84 against those created by the reciprocation of the sickle 22. In the present case, the lower portion 88 of the member 84 is increased in weight as designated by the letter W.

The casing 42, being hollow, is adapted to contain lubricant, which, among its obvious purposes, may be said to have somewhat of a cushioning or quieting effect on the reciprocating member 84.

The remainder of the structure illustrated is generally conventional and comprises means for adjusting the cutter bar 18 about the longitudinal axis through the trunnions 50 and 52, and may include a hydraulic motor 100 for operating a rockshaft 102 journaled in bearings 104 on the drawbar 14 and having a rearwardly extending arm 106 connected to link and lever means 108 which in turn is connected to the cutter bar 18 outside the pivot axis of the trunnions 50—52. The lifting means illustrated forms no part of the present invention and is illustrated merely as an example of how the present invention may be embodied in a mower of conventional design.

It will be seen from the foregoing description that a novel driving mechanism has been provided incorporating counterweighted drive means intermediate the input and output members for the reciprocating cutter bar, the counterweighted drive means being characterized in that it includes a reciprocating counterweight whereby the inertia forces created by opposite reciprocating of the counterweight and sickle are balanced against each other. The embodiment illustrated is susceptible to considerable modification to suit the application of the invention to particular situations and may involve various changes in proportions of the parts, accommodation of peculiar bearing loads and other factors. Various other modifications and alterations in the preferred embodiment of the invention illustrated may be made without departing from the spirit and scope of the invention as defined in the appended claims.

What is claimed is:

1. For a harvester having a support and a cutter bar including a sickle reciprocable thereon: sickle drive means comprising a housing having base means thereon for affixation to the cutter bar, said housing being hollow and having a pair of coaxially spaced bearings on an axis above the base means and transverse to the line of reciprocation of the sickle, said housing further having external means providing for connection of the housing to the harvester support; an input shaft extending through and journaled in one of the bearings and having a crank arm fixed to its inner end within the housing; an output shaft extending through and journaled in the other bearing and having an inner crank arm fixed to and upstanding from its inner end within the housing and an outer crank arm fixed to and depending from its outer end externally of the housing, said outer crank arm having means thereon for effecting an operative driving connection to the sickle; a crosshead within the housing; means mounting said crosshead in the housing for reciprocation in a plane normal to the axis of the input and output shafts; means including a pin and slot connection interconnecting the crosshead and the input crank arm; and means including a pin and slot connection interconnecting the crosshead and the inner crank arm of the output shaft.

2. The invention defined in claim 1, further characterized in that: the means for mounting the crosshead includes an upper and a lower slide both parallel to the line of reciprocation of the sickle and respectively slidably carrying the crosshead at upper and lower portions of said crosshead; and the means interconnecting the crosshead and the inner crank arm of the output shaft is made at the upper portion of the crosshead.

3. The invention defined in claim 2, further characterized in that: a counterweight is carried by the lower portion of the crosshead within the housing.

4. For a harvester having a support and a cutter bar including a sickle reciprocable thereon: sickle drive means comprising a housing having means thereon for affixation to the cutter bar, said housing being hollow and having a pair of coaxially spaced bearings on an axis transverse to the line of reciprocation of the sickle, said housing further having external means providing for connection of the housing to the harvester support; an input shaft extending through and journaled in one of the bearings and having a crank arm fixed to its inner end within the housing; an output shaft extending through and journaled in the other bearing and having an inner crank arm fixed to its inner end within the housing and an outer crank arm fixed to its outer end externally of the housing, said outer crank arm having means thereon for effecting an operative driving connection to the sickle; a cross head within the housing; means mounting said crosshead in the housing for reciprocation in a plane normal to the axis of the input and output shafts; drive means interconnecting the crosshead and the input crank arm; and drive means interconnecting the crosshead and the inner crank arm of the output shaft.

5. For a harvester having a support and a cutter bar including a sickle reciprocable thereon: sickle drive means comprising a housing having means thereon for affixation to the cutter bar, said housing being hollow and having a pair of coaxially spaced bearings on an axis transverse to the line of reciprocation of the sickle, said housing further having external means providing for connection of the housing to the harvester support; an input shaft extending through and journaled in one of the bearings and having a crank arm fixed to its inner end within the housing; an output shaft extending through and journaled in the other bearing and having an inner crank arm fixed to its inner end within the housing and an outer crank arm fixed to its outer end externally of the housing, said outer crank arm having means thereon for effecting an operative driving connection to the sickle; a crosshead within the housing; means mounting said crosshead in the housing for reciprocation in a plane normal to the axis of the input and output shafts; drive means interconnecting the crosshead and the input crank arm; and drive means interconnecting the crosshead and the inner crank arm of the output shaft.

6. For a harvester having a cutter bar including a sickle reciprocable thereon: sickle drive means comprising a housing having means thereon for affixation to the cutter bar, said housing being hollow and having a pair of coaxially spaced bearings on an axis transverse to the line of reciprocation of the sickle; an input shaft extending through and journaled in one of the bearings and having a crank arm fixed to its inner end within the housing; an output shaft extending through and journaled in the other bearing and having an inner crank arm fixed to its inner end within the housing and an outer crank arm fixed to its outer end externally of the housing, said outer crank arm having means thereon for effecting an operative driving connection to the sickle; a crosshead within the housing; means mounting said crosshead in the housing for reciprocation in a plane normal to the axis of the input and output shafts; drive means interconnecting the crosshead and the input crank arm; and drive means interconnecting the crosshead and the inner crank arm of the output shaft.

7. For a harvester having a support and a cutter bar including a sickle reciprocable thereon: sickle drive means comprising a carrier having means thereon for affixation to the cutter bar, said carrier having a pair of coaxially spaced bearings on an axis transverse to the line of reciprocation of the sickle and further having external means providing for connection of the housing to the harvester support; an input shaft extending through and journaled in one of the bearings and having a crank arm fixed to its inner end in the space between the bearings; an output shaft extending through and journaled in the other bearing and having an inner crank arm fixed to its inner end in the space between the bearings and an outer crank arm fixed to its outer end externally of said other bearing, said outer crank arm having means thereon for effecting an operative driving connection to the sickle; a crosshead in the space between the inner crank arms; means mounting said crosshead on the carrier for reciprocation in a plane normal to the axis of the input and output shafts; drive means interconnecting the crosshead and the input crank arm; and drive means interconnecting the crosshead and the inner crank arm of the output shaft.

8. For a harvester having a cutter bar including a sickle reciprocable thereon: sickle drive means comprising a carrier having means thereon for affixation to the cutter bar, said carrier having a pair of coaxially spaced bearings on an axis transverse to the line of reciprocation of the sickle; an input shaft extending through and journaled in one of the bearings and having a crank arm fixed to its inner end in the space between the bearings; an output shaft extending through and journaled in the other bearing and having an inner crank arm fixed to its inner end in the space between the bearings and an outer crank arm fixed to its outer end externally of said other bearing, said outer crank arm having means thereon for effecting an operative driving connection to the sickle; a crosshead in the space between the inner crank arms; means mounting said crosshead on the carrier for reciprocation in a plane normal to the axis of the input and output shafts; drive means interconnecting the crosshead and the input crank arm; and drive means interconnecting the crosshead and the inner crank arm of the output shaft.

9. The invention defined in claim 8, further characterized in that: the means for mounting the crosshead includes an upper and a lower slide both parallel to the line of reciprocation of the sickle and respectively slidably carrying the crosshead at upper and lower portions of said crosshead; and the means interconnecting the crosshead and the inner crank arm of the output shaft is made at the upper portion of the crosshead.

10. The invention defined in claim 9, further characterized in that: a counterweight is carried by the lower portion of the crosshead.

11. For a harvester having a support and a cutter bar including a sickle reciprocable thereon: sickle drive mechanism, comprising a carrier having means thereon for the fixed mounting thereof on the cutter bar; driving means including a rotary part journaled on the carrier on an axis transverse to the line of reciprocation of the sickle; a reciprocating slide member; means mounting the slide member on the carrier and confining movement of said slide member to reciprocation along a line paralleling the line of reciprocation of the sickle; drive means connecting the rotary driving part and the slide member; and driven means for connection to the sickle, including an oscillating driven part comprising a lever of the first class fulcrumed on the carrier and having one end connected to the slide member and its other end adapted for connection to the sickle.

12. For a harvester having supporting structure including cutting mechanism provided with a reciprocating sickle: sickle drive mechanism, comprising a carrier having means thereon for the mounting thereof on the supporting structure; driving means including a driving part movably borne by the carrier; a reciprocating slide member; means mounting the slide member on the carrier and confining movement of said slide member to reciprocation along a line paralleling the line of reciprocation of the sickle; drive means connecting the driving part and the slide member to reciprocate said slide member; and driven means for connection to the sickle, including an oscillating driven part comprising a lever of the first class fulcrumed on the carrier and having one end connected to the slide member and its other end adapted for connection to the sickle.

13. For a harvester having supporting structure including cutting mechanism provided with a reciprocating sickle: drive mechanism for the sickle, comprising a carrier having means for the mounting thereof on the supporting structure; driving means having an input part rotatably carried by the carrier on an axis transverse to the line of reciprocation of the sickle; a reciprocating part carried by the carrier for reciprocation along a line parallel to the line of reciprocation of the sickle; counterweight means connected to the reciprocating part for reciprocation thereby so proportioned as to substantially balance the weight of the sickle; drive means connecting the input part and the reciprocating part; and second drive means for connecting the reciprocating part and the sickle, said second drive means including mechanism for effecting reciprocation of the sickle in alternate strokes respectively opposite to the alternate strokes of reciprocation of the counterweight, whereby the inertia forces of the counterweight and sickle are substantially balanced against each other.

14. For a harvester having supporting structure including cutting mechanism provided with a reciprocating sickle: sickle drive mechanism, comprising a carrier having means for the mounting thereof on the supporting structure; a reciprocating member carried by the carrier for recipocation along a line generally in alinement with the line of reciprocation of the sickle; drive means operatively connectible to the sickle and reciprocating member for reciprocating the reciprocating member and the sickle in alternate opposite strokes; and counterweight means connected to the reciprocating member for reciprocation therewith and so proportioned that the inertia forces of the sickle and said counterweight are substantially balanced.

15. For a harvester having a support and a cutter bar including a sickle reciprocable thereon: sickle drive mechanism, comprising a carrier having means thereon for the fixed mounting thereof on the cutter bar; driving means including a rotary part journaled on the carrier on an axis transverse to the line of reciprocation of the sickle; a reciprocating slide member carried by the carrier for reciprocation along a line paralleling the line of reciprocation of the sickle; drive means connecting the rotary driving part and the slide member; and driven means for connection to the sickle, including an oscillating driven part comprising a lever of the first class fulcrumed on the carrier and having one end connected to the slide member and its other end adapted for connection to the sickle, said slide member being counterweighted to balance the inertia forces of its reciprocation against those of the sickle.

16. For a harvester having a support and a cutter bar including a sickle reciprocable thereon: sickle drive mechanism, comprising a carrier having means thereon for the fixed mounting thereof on the cutter bar; driving means including a rotary part journaled on the carrier on an axis transverse to the line of reciprocation of the sickle; a reciprocating slide member carried by the carrier for reciprocation along a line paralleling the line of reciprocation of the sickle; drive means connecting the rotary driving part and the slide member; and driven means for connection to the sickle, including an oscillating driven part comprising a lever of the first class fulcrumed on the carrier on an axis coaxial with the axis of the rotary driving part and having one end connected to the slide member and its other end adapted for connection to the sickle.

MAHLON L. LOVE.

REFERENCES CITED

The following references are of record in the file of this patent:

UNITED STATES PATENTS

| Number | Name | Date |
|---|---|---|
| 2,130,795 | Gollnick | Sept. 20, 1938 |
| 2,305,959 | Frederiksen | Dec. 22, 1942 |
| 2,503,605 | Abgarian | Apr. 11, 1950 |